United States Patent [19]
Zenty

[11] 4,177,120
[45] Dec. 4, 1979

[54] PHOTOLYTIC PROCESS FOR GASIFICATION OF CARBONACEOUS MATERIAL

[75] Inventor: Stephen Zenty, Rockville, Md.

[73] Assignee: Solarco Corporation, Rockville, Md.

[21] Appl. No.: 896,484

[22] Filed: Apr. 14, 1978

Related U.S. Application Data

[63] Continuation-in-part of Ser. No. 792,446, Apr. 29, 1977, abandoned.

[51] Int. Cl.² ............................................. B01J 1/10
[52] U.S. Cl. .................................. 204/157.1 R; 34/36; 204/158 R; 204/162 R
[58] Field of Search ..................... 204/157.1 R, 158 R, 204/162 R, 173, 177, 178

[56] References Cited
U.S. PATENT DOCUMENTS

| | | | |
|---|---|---|---|
| 3,113,086 | 12/1963 | Taylor | 204/157.1 R |
| 3,120,479 | 2/1964 | Dols et al. | 204/162 R |
| 3,503,865 | 3/1970 | Stone | 204/157.1 R |
| 4,010,089 | 3/1977 | Stowell et al. | 204/168 |
| 4,076,607 | 2/1978 | Zavitsanos et al. | 204/162 R |

OTHER PUBLICATIONS

Falconer et al., Chem. Abs., vol. 79, 151503y, (1973).
Lewis, College Chemistry, Barnes and Noble Books, New York, 1971, p. 198.

*Primary Examiner*—Leland A. Sebastian
*Attorney, Agent, or Firm*—Donald D. Jeffery

[57] ABSTRACT

Process and apparatus are disclosed for converting carbon dioxide to carbon monoxide by subjecting the carbon dioxide to radiation in the presence of carbonaceous material such as coal to form carbon monoxide. The preferred form of radiation is solar energy, and the process is preferably carried out in an atmosphere essentially free of oxygen. The invention also include subjecting carbon monoxide to radiation to form purified carbon and useful heat energy. The two procedures can be combined into a single process for converting solar or other energy into useful thermal energy with the production of useful products. The reactor apparatus is specifically designed to carry out the radiation-induced conversions. Coal can be desulfurized and its caking characteristics altered by solar radiation is the presence of suitable gases.

11 Claims, 3 Drawing Figures

PHOTOLYTIC PROCESS FOR GASIFICATION OF CARBONACEOUS MATERIAL

REFERENCE TO RELATED APPLICATION

This application is a continuation-in-part of my application Ser. No. 792,446, filed Apr. 29, 1977, now abandoned, and entitled "Radiation Carbon Oxides Coal Conversion Process and Reactor".

BACKGROUND OF THE INVENTION

The present invention principally relates to a system for utilizing the various forms of electromagnetic radiation, preferably solar energy, to convert, in a solar reactor, carbon dioxide and carbonaceous matter to carbon monoxide and other gaseous fuel components. Carbon monoxide is a useful source of thermal energy and the present invention therefore permits efficient conversion of solar energy to another form of thermal energy. In a further aspect of the invention carbon monoxide can be converted to a highly purified and useful form of carbon, with the concomitant production of useful heat energy.

The present energy crisis and the demand for environmentally acceptable fossil fuels have made coal conversion imperative and of high priority in proposed national energy programs. In addition, the increasing use of solar energy has dramatized the need for chemical storage of energy forms, such as solar, which are sporadically or intermittently available. No practical chemical radiation energy conversion and storage system exists today, as far as applicant is aware.

It is therefore highly desirable that a system be found that permits the efficient conversion of large reserves of coal or other carbonaceous material to environmentally acceptable energy forms. It is particularly desirable that such a system be capable of utilizing and storing solar energy, in view of the renewable nature of this energy source.

There is prior art patent literature which is relevant to the basic chemical reactions occurring in accordance with the present invention. For example, U. S. Pat. No. 1,812,230 discloses a method of preparing elementary carbon from carbon monoxide at temperatures of 300°–500° C. in the presence of a catalyst. However, normal heat generating means are provided rather than solar energy. Essentially the same disclosure and limitations are disclosed in U.S. Pat. No. 1,865,053, which teaches combining carbon and carbon dioxide to form carbon monoxide, at elevated temperatures, for example, 800°C.–1500° C., and U.S. Pat. No. 2,008,270 similarly discloses the disassociation of carbon monoxide in the presence of a catalyst into useable forms of carbon, and carbon dioxide.

Known prior art also includes reactions of the type described in which various electromagnetic radiations from artificial sources are provided for carrying out the reactions. For example, in U.S. Pat. No. 3,977,952, there is disclosed the irradiation of carbon-containing compounds in gaseous form, such as polluted air or industrial flue gas, for the purpose of decomposition. U.S. Pat. No. 4,045,315 describes the production of hydrogen by the solar photolysis of water, and U.S. Pat. No. 4,070,861 discloses a solar reactor combustion chamber to which are fed molecular hydrogen and chlorine, together with oxygen, to form hydrochloric acid. The reaction is exothermic and the heat and pressure formed can be subsequently utilized as energy sources.

U.S. Pat. No. 3,993,458 relates to a method for producing synthetic fuels from solid waste, and disclosed in this patent is a fluidized bed reactor adapted to be heated by a tower top solar furnace. Although the process is principally concerned with the pyrolysis and gasification of solid organic waste, coal is mentioned as a feed material, and carbon dioxide or steam, or mixtures of these two gases, are used to fluidize the reactive bed which may comprise coal or other waste materials. Although carbon monoxide and carbon dioxide are products of the pyrolysis, the reactions are carried out in a steam atmosphere in the presence of a catalyst. The producer gas obtained from the reaction can be used as the heat source for the working fluid during periods when solar energy is minimized or unavailable. The reactions are carried out at temperatures of 600°C.–700° C., and not in the absence of free oxygen, an important feature of the present invention as will be hereinafter described.

An important aspect of the present invention is the specific design of the solar reactor and the operating conditions maintained therein. Solar heating apparatuses are presently becoming a highly developed area of technology and the following patents are representative of the prior art. U.S. Pat. Nos. 3,655,517 and 3,501,381 disclose solar distillation units in which collecting troughs are provided beneath the glass or window surface to provide means for carrying off the condensate formed on the undersurface of the glass during the distillation process. U.S. Pat. Nos. 3,985,118 and 4,011,857 disclose solar heating systems which utilize lenses for converging and thus concentrating the solar rays toward a focal point for more efficient utilization of the solar energy. The latter patent discloses the positioning of the lens in a housing mounted for controlled movement to permit tracking of the sun for most efficient reception of the solar energy. This feature of tracking is per se well known and also disclosed in U.S. Pat. No. 4,057,401, which discloses a solar heat section in which the glass part of the section is mounted in a sealed housing which moves through a specified angle relative to the horizontal for tracking purposes. It should be noted that in the system, the solar heat is employed to heat air, which is in turn used to heat the digester tanks which form part of the apparatus for manufacturing methane gas.

SUMMARY OF THE INVENTION

The present invention has a number of principal advantages and objectives. Perhaps the foremost of these is the utilization of solar energy which can be captured and converted into a readily useable form whch is essentially environmentally clean. $CO_2$ is subjected to radiation in the presence of carbonaceous material, preferably coal, to produce carbon monoxide. This gas is of high BTU content and can be removed from the system to complete the energy conversion. Alternatively, the carbon monoxide upon further radiation in the absence of oxygen or any oxygen donor is converted into carbon and nascent oxygen, with the latter reforming with carbon monoxide to product carbon, carbon dioxide and substantial amounts of energy, as the reaction is exothermic. The operating conditions for the system are important, and it is critical that the described reactions be carried out in the absence of atmospheric oxygen and nitrogen. This essential feature, in combination with the solar radiation and elevated temperatures due to the concentration of the solar energy, are the features which distinguish the present invention from other solar radiation systems or thermal reaction systems which produce carbon monoxide or carbon dioxide. In this regard, it should be noted that molecular dissociation due to solar radiation is achieved at temperatures below the temperatures required for thermal reactions whereby the present invention need not be confined to a high temperature environment, that is, molecular dissociation will take place away from the areas of concentrated solar energy where thermal reaction temperatures may be reached.

A further important objective of the invention is to provide a solar reactor specifically designed for carrying out the processes of the invention. The reactor is particularly characterized by a plurality of spaced concentrating lenses positioned in or above the glass top of the reactor, trough means for removing condensate formed on the inner surface of the glass top, and agitation means for continually agitating and conveying the carbonaceous material. Although the lens assemblies may be fixed, it may in certain installations be desirable to moveably mount the lens assemblies for tracking purposes so as to more efficiently capture the solar energy. The agitating means functions both to continuously turn the carbonaceous material and to convey the same toward the discharge end of the reactor. The churning is important so as to expose maximum untreated surface areas of the carbonaceous material to the solar radiation so as to more uniformly treat the material. As the material is conveyed through the reactor, dissociation and gasification continues, with the material at the discharge end of the reactor being in slag or powdered form. This end product in itself is highly useful as a byproduct. It will be understood that the feeding of carbonaceous material to the reactor and the removal of the treated material from the rector will be such as to maintain the condition in the reactor free of atmospheric air. The feed and removal can be effected by any suitable means such as, for example, air locks or the like. Likewise, the feed gases will be admitted into the reactor in order to maintain the desired atmospheric conditions therein.

Other important objectives can also be achieved in accordance with the solar reactor of the present invention. Desulfurization of coal, for example, can be achieved, and both organic and inorganic forms of sulfur can be removed. Present desulfurizing techniques normally remove only the inorganic sulfur content from coal, thereby rendering it difficult to meet the low sulfur requirements of recent Federal and state regulations. Further, the apparatus of the invention can be employed with nitrogen dioxide as the feed gas, rather than carbon dioxide, to gasify the carbonaceous matter. Nitrogen dioxide dissociates more readily upon irradiation than carbon dioxide and therefore coal gasification, desulfurization, and decaking can be more readily accomplished. The reaction products of the gasification reaction are carbon monoxide and nitrogen monoxide which may be subsequently separated for utilizing the thermal energy of the carbon monoxide. Still further, the solar reactor can be used to dry agricultural crops, products and byproducts in an air free environment in temperatures of, for example, 150°-600° F. The drying is similarly in an air free environment in order to prevent oxidation, with the reactor functioning to remove the moisture from the products at such temperatures.

BRIEF DESCRIPTION OF THE APPLICATION DRAWINGS

DESCRIPTION OF THE PREFERRED EMBODIMENTS

Figure 1:
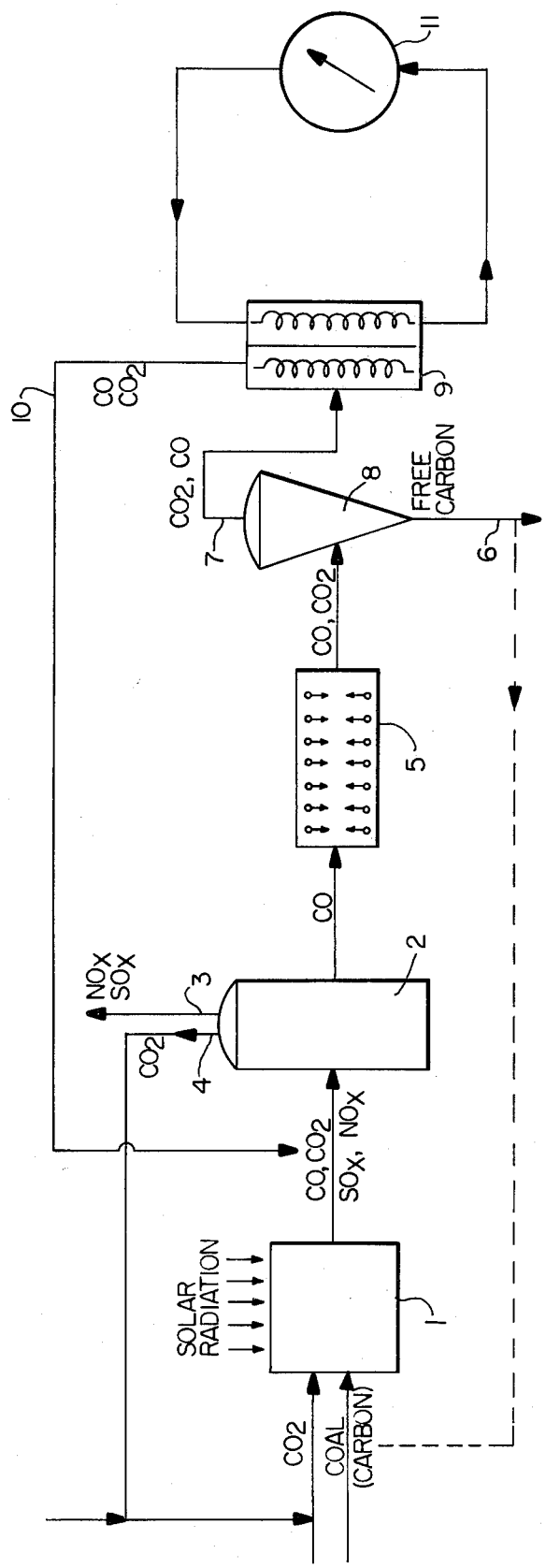
FIG. 1 is a schematic showing of the solar energy conversion system.

Carbon dioxide and a carbonaceous material such as coal are subjected to irradiation in an atmospheric oxygen free environment and at least a localized elevated temperature to produce a mixture of gases in which carbon monoxide predominates and is free of atmospheric nitrogen, as well as other materials depending on the type of carbonaceous material employed. The carbonaceous material may be in gaseous, liquid or solid form, e.g. powder. Although coal is the preferred source of carbonaceous material, other sources, although not exhaustive, may include lignite; peat; coke; char; charcoal; vegetable or plant matter; animal manure; sewage sludge; tar; asphalt, and pitch. It will be understood that combination of these materials may be used.

The carbon monoxide can be separated by known methods from the other products and used directly as a clean efficient gaseous fuel, or be subjected to further irradiation to produce a highly purified form of carbon together with carbon dioxide and thermal energy. The thermal energy can be utilized as desired, including recycling along with the carbon dioxide to the initial stage of the system. The invention therefore alternatively serves as a source of gaseous fuel, purified carbon, and, in all cases, an efficient means for storing and converting various forms of available energy such as solar energy into more conveniently used forms by means of readily available carbonaceous materials. It should be noted that carbon monoxide can readily be used for the production of hydrogen, synthetic natural gas and alcohols in addition to high purity carbon.

The initial conversion of carbon dioxide to carbon monoxide occurs according to the overall reaction:

$$CO_2 + C \rightarrow 2CO \qquad (1)$$

This reaction is stimulated by electromagnetic energy, which can be solar energy, at elevated temperatures, optionally in the presence of a suitable catalyst. The reaction (1) actually is the sum of two sequential reactions in which $CO_2$ first dissociates according to

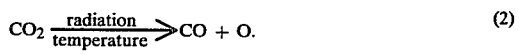

$$CO_2 \xrightarrow[\text{temperature}]{\text{radiation}} CO + O. \qquad (2)$$

and

$$C + O \rightarrow CO \qquad (3)$$

Reaction (2) is endothermic and requires about 45 Kg. cal/mole of carbon, while reaction (3) is slightly exothermic. While the overall reaction proceeds most efficiently at temperatures in excess of 100° C., preferably 600°-1200° C., the use of external sources of energy, other than the radiation used, can be avoided since coal is a near perfect black body absorber of energy. As will be hereinafter described, localized heating due to concentrated solar energy will normally be higher than the range indicated, but the reactions will proceed at temperatures substantially lower than the thermal reaction temperatures due to the radiation energy.

The reaction products obtained according to the overall reaction (1) may contain, in addition to CO, other gases and/or liquids depending on the source of carbon. Coal, for example, may also contain water, hydrocarbons, volatile matter, sulfur, nitrogen compounds, metals, etc. some of which can also be dissociated by solar or other energy.

Reactions also taking place when a carbonaceous matter such as coal contains water, hydrocarbons, tar, and various other organic and inorganic compounds and is irradiated with solar energy in the presence of carbon dioxide fall into the category of the general reactions shown below:

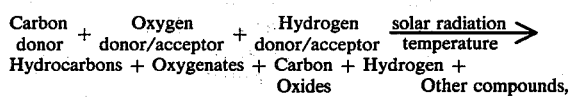

in which a carbon donor comprises an organic or inorganic compound containing carbon, e.g., coal; an oxygen donor is any oxygen containing organic or inorganic compound, e.g., $CO_2$, $H_2O$ and oxygenates; an oxygen acceptor comprises any carbon containing matter or hydrocarbon that accepts oxygen from an oxygen donor and in so doing converts to carbon oxides, oxygenates or other oxygen containing compounds; an hydrogen donor comprise any hydrogen containing compound, e.g., water, hydrocarbons, or oxygenates such as alcohols; oxygenates comprise any matter or substance containing carbon, hydrogen and oxygen; e.g., alcohols; aldehydes; ketones; acids, etc., and other compounds include oxides and hydrides of sulfur and nitrogen; trace metals and their oxides and salts; ash; slag; tar; cyclic and polycyclic organic compounds; alcohols; aldehydes; ketones; phenolic compounds, and hydrides of sulfur, nitrogen and carbon.

The fundamental process taking place in the above reactions is photolytic dissociation of complex molecules (e.g., the polymeric coal structure; cyclic organic compounds, hydrocarbons, water and any polyatomic molecules) into radicals (atomic oxygen and hydrogen; hydroxyl radicals; etc.) which in turn readily interact with other radicals and molecules to result in new chemical forms. However, Co is predominant.

It should be noted that this photolytic "cracking" of the complex polymeric structure of caking coal results in the alteration of caking properties. Destruction of the caking characteristics of certain coal types is important commercially because some coal conversion processes (e.g., the Lurgi gasifier) or technologies are unable to operate with caking coals. The photolytic decaking process may take place in the absence of air and (a) in the presence of $CO_2$, or (b) in the presence of nitrogen, or (c) in the absence of externally introduced gas. This can be accomplished by purging the air from the reactor by gases generated from the coal itself once irradiation begins, thus replacing the air environment with gaseous products produced internally.

Various forms of solar energy and electromagnetic radiation, including that obtained from electric arcs and electric arc lamps can be used to bring about the dissociation of carbon dioxide according to equation (2). This energy or radiation should have a wave length below about 10,000 Å and preferably 1500 Å to 7500 Å. The use of solar energy is, of course, preferred and the solar energy can be concentrated by means of Fresnel lens, parabolic mirrors, or similar known devices, discussed below in connection with FIGS. 1 and 2 of the application drawings.

It will, however, be appreciated that the temperature at which dissociation of the $CO_2$ occurs and the wave length of the impinging energy are interdependent. Solar radiation, for example, is composed of a mixture of electromagnetic quanta (photons) of different wave lengths, and the energy content of a photon is inversely proportional to its wave length. Since the dissociation energy requirement of a molecule is a function of temperature for each molecular dissociation, one photon of sufficiently large energy content is required for dissociation of one molecule; and the higher the reactant temperature, the greater the proportion of photons will participate efficiently in molecular dissociations.

The overall reaction (1) may proceed within the pressure range of 0.1 to 100 atmospheres, preferably 0.5–10 atmospheres. Catalytic materials may be employed to further the reaction, although they are not essential. Typical catalysts which are suitable and which are known in the art are Cu, Zn, Ti, Zr, V, Cr, Mo, W, Fe, Ru, Os, Co, Rh, Ln, Ni, Pd and Al, their oxides, halide salts, nitrogen and sulfide salts. Most of these may naturally occur in coal or in coal ash and thus coal is, to a large extent, autocatalytic. Cobalt molybdate and $NaHCO_3$ can also be used.

The carbon monoxide produced by the process of reactions (1)–(3) can, of course, be used directly as a fuel. Alternatively, the carbon monoxide can be subjected to further irradiation according to the equations:

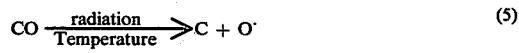 (5)

 (6)

The sum of equations (5) and (6) can be expressed:

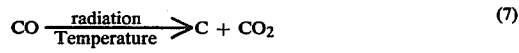 (7)

Reaction (5) is an endothermic dissociation reaction which is radiation induced, in the absence of atmospheric oxygen and at elevated temperatures preferably in excess of 100° C. The nascent oxygen produced by equation (5) is highly reactive and combines with carbon monoxide according to equation (6) in an exothermic reaction to form $CO_2$ and heat. A highly purified carbon product is obtained from the total reaction. This purified carbon finds many uses, for example, in the manufacture of tires, printer's ink, diesel fuel additives, etc. The use of elevated temperatures is desirable to decrease the chemical bond dissociation energy requirement and thus permit the effective utilization of longer wavelength electromagnetic or solar radiation. Reactions (5)–(7) can also be carried out using appropriate catalysts such as carbon or the type heretofore noted, and at pressures of 0.1 to 200 atmospheres, preferably 25–75 atmospheres.

FIG. 1 is a schematic diagram showing preferred apparatus utilizing coal and solar radiation. Carbon dioxide is passed into a solar radiation chamber either along with coal or other suitable carbonaceous material, or into a solar radiation chamber already containing the required coal or carbonaceous material. Concentrated solar radiation enters the radiation chamber 1 where it impinges on a mixture of coal and carbon dioxide to produce carbon monoxide, and possibly $SO_x$ and $NO_x$. During the solar irradiation in chamber 1 the requisite conditions of temperature and absence of atmospheric oxygen and nitrogen are maintained.

The gaseous products removed from the irradiation chamber 1 may also contain some unreacted carbon dioxide. All of the product or unreacted gases are passed into a separation chamber 2, and the carbon dioxide is recycled as shown at 4 to the original gas input. The $NO_x$ and $SO_x$ gases are removed at 3 and relatively pure carbon monoxide removed from the separation vessel 2. This carbon monoxide may be taken off and employed directly as a fuel or, as shown in the drawing, subjected to irradiation in a second solar irradiation chamber 5 to bring about dissociation of the carbon monoxide and ultimate formation of highly purified carbon and carbon dioxide which are passed into a further separation chamber 8. The elemental carbon is removed from the bottom of the separation chamber 8 as shown at 6, and carbon dioxide along with unconverted carbon monoxide are removed from the top of the vessel 8 at 7 in a hot gaseous state. This hot gas is conveyed to heat exchanger 9 where the thermal energy is recovered by conventional means and used, for example, in power generator 11. After passage through the heat exchanger 9 the cooled gases may then be returned by way of 10 to a point between the initial solar radiation chamber 1 and the separator 2.

Figure 2:
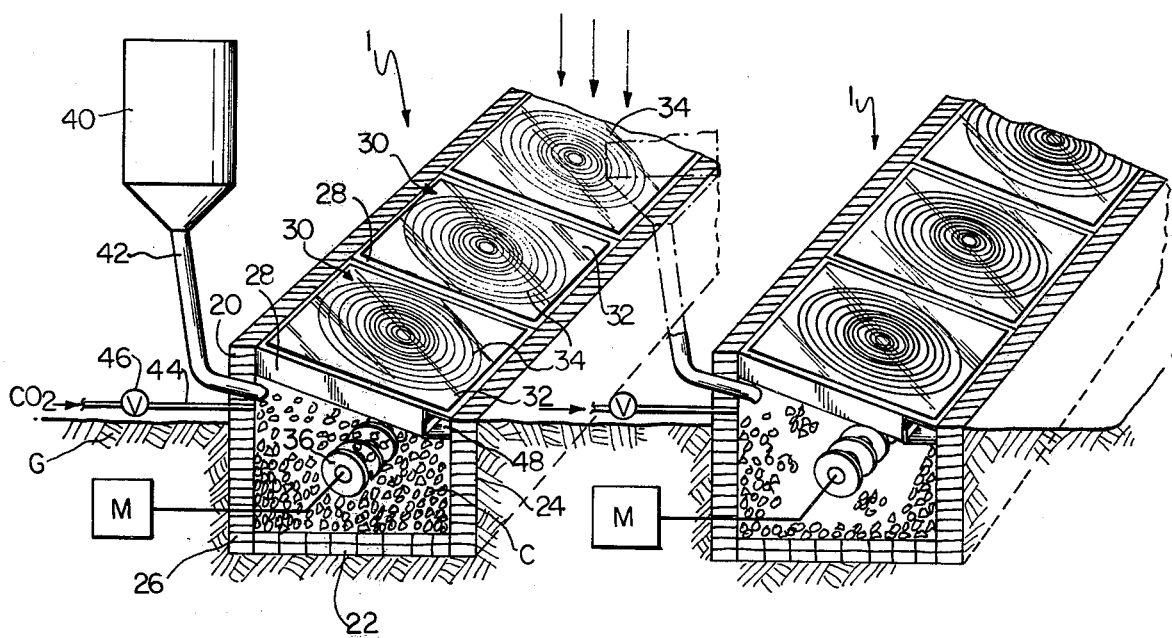
FIG. 2 is a partially diagrammatic and sectional view of a length of the solar reactor.

The solar reactor shown schematically in FIG. 1 is illustrated in FIG. 2 and reference is made thereto. In the form shown, two laterally spaced reactors 1 are illustrated, with each being shown broken away in the longitudinal direction. It will be understood that the length of each reactor will be determined by the type of carbonaceous feed material and the operating conditions within the reactor. For example, the reactor may extend several hundred feet, although the entire length of the reactor is constructed in essentially the same manner as shown fragmentarily in FIG. 2.

The reactor includes a reactor housing 20 which can be of any suitable construction, preferably including refractory material, and as shown in FIG. 2, the reactor is partially submerged below ground level G. The reactor includes a bottom wall 22 and side wall portions 24 and 26, with the latter being more extensive in height than the wall 24. A series of frames commonly designated at 28 are mounted in tightly sealed position between the side walls 24 and 26, with the tops of the frames being generally coplanar with the tops of the side walls whereby the frames are inclined or slanted toward the side wall 24 as shown in FIG. 2. Although only three frame sections 28 are shown in FIG. 2 for each reactor section, it will be understood that these will continue longitudinally of the reactor to form a top frame wall for the reactor. The frames can be sealed relative to the side walls 24 and 26 in any suitable manner so as to permit the maintaining of the desired environmental conditions within the reactor. As above noted, an important feature of the invention is the irradiation of the coal in the presence of carbon dioxide in an essentially atmospheric oxygen free environment, and the sealing of the frames 28 should be such as to permit these operating conditions to be maintained.

Mounted in each frame 28 is a lens assembly generally designated at 30 each of which comprises a clear glass outer region 32 and a lens 34 mounted centrally in the assembly. The purpose of the lens is to concentrate the solar radiation, and any lens of suitable type and construction can be employed, including the well-known Fresnel lens which is commercially proven and available.

Although the lens 34 as shown is integrally carried by the outer glass portions 32 of the lens assembly, it will be understood that the lens may be mounted for pivotal movement relative to the outer glass section, for example, as shown in U.S. Pat. No. 4,057,401. Likewise, the entire lens and outer glass top portion 32 can be mounted for pivotal movement relative to the frame 28. In either such arrangement, the pivoting or tilting movement of the lens 34 will permit tracking of the sun for most efficient radiation acceptance.

Solar radiation will be admitted to the interior of the reactor through both the lens 34 and the outer glass portion 32 of the lens assembly. However, the lens 34 permits concentration of the radiation toward a focal point which can be located as described relative to the carbonaceous material C in the reactor. The focal length of the lens can be selected so as to concentrate the solar radiation at the desired point in the carbonaceous bed, either at the surface thereof or slightly above the surface.

Due to the concentration of solar radiation, the temperatures obtained at the focal point of the radiation will be relatively high and may reach or exceed thermal reaction temperatures. Temperatures will of course be less away from the focal point but dissociation will nevertheless occur due to the radiation energy. In fact, by virtue of the radiation energy, dissociation is possible at temperatures as low as 100° C. As the temperatures within the reactor rise, the reaction rates increase.

In view of the high localized temperature at the focal point of the lens, dissociation of carbon dioxide and the gasification is quite rapid in that region, and it is therefore desirable to agitate the bed of carbonaceous material C so as to remove the ash and slag material from the region of the focal point and convey unreacted material to that region. The desired agitation is accomplished in the form shown by means of an auger 36 which is rotatably driven by a motor M, shown schematically in FIG. 2. The diameter and pitch of the auger can be selected as desired and will depend to some degree upon the carbonaceous feed material. The auger 36 also performs the function of conveying the carbonaceous material longitudinally in the reactor from the feed inlet end, shown foremost in FIG. 2, to the outlet end (not shown). It will be understood that as the material is conveyed longitudinally of the conveyor the material undergoes further reaction in accordance with the above description whereby the material carried off at the end of the reactor is generally ash or slag in form, with the spent material being discharged in a suitable manner forming no part of the present invention.

The carbonaceous material can be stored in a hopper 40 and gravity fed through hopper discharge line 42 to the reactor. It will be understood that the connection at the end of the feed line 42 through the side wall 26 of the reactor will be sealed, and that the feed line itself will be sealed, for example, by means of an airlock or similar device. In this manner, the desired environmental conditions can be maintained in the reactor. The hopper 40 is schematically shown in FIG. 2 and it will be understood that the constructional detail thereof forms not part of the present invention. In lieu of the hopper 40, the carbonaceous material can be delivered to the reactor in other known manners, as long as the delivery is such as to maintain the desired conditions in the reactor.

The reactant gas can be delivered to the reactor through a feed line extending in sealed relation through either wall of the reactor. In the form shown, a reactant feed line 44 is shown for delivering carbon dioxide to the reactor, with a valve 46 being positioned in the line to maintain the environment within the reactor.

The frames 28 and lens assemblies mounted therein are shown inclined in FIG. 2 for the purpose of collecting and moving condensate. A trough 48 is provided adjacent the lower end of the frame and lens assembly for condensate collection, with the condensate being removed from the reactor in any suitable manner. The condensate is formed during the reaction process as a result of the impurities in the coal, including water. The water is converted to steam, and hydrocarbon vapors, which also are formed during the reaction process, impinge on the undersurface of the lens assembly to form condensates since the roof of the reactor is the coldest region of the system. It will be understood that the liquids and gases are removed from the reactor primarily in the sections of the reactor adjacent the feed inlet, or at any other suitable place.

During the initial stages of the reaction (5), a catalyst may be desired, until the reactions have proceeded to the point where free carbon is formed and available. After that, the free carbon can provide the catalytic effect desirable to increase reaction time, thereby greatly reducing the need for other types of catalysts which might, in certain instances, cause undesired chemical reactions.

Figure 3:
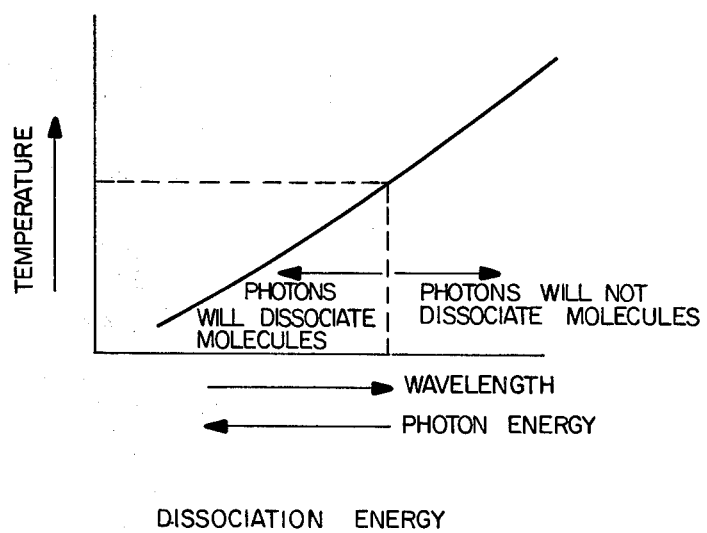
FIG. 3 is a graph showing the molecular dissociation energy-temperature relationship.

As above noted the temperature at which dissociation of the $CO_2$ occurs and the wavelength of the impinging radiation energy are interdependent. The graph of FIG. 3 illustrates more clearly this relationship. The ordinate of the graph represents temperature and the abscissa comprises the wavelength and photon energy. It is well known that solar radiation is composed of photons of different wavelengths and frequency distribution over the entire electromagnetic energy (photon) spectrum. The energy content of a photon is wavelength dependent and is inversely proportional to it. Thus, if a photon of sufficiently high energy content impinges on a molecule, the molecule dissociates into its component radicals, for example, carbon dioxide in the presence of photon energy will dissociate into carbon monoxide and nascent oxygen. However, temperature is definitely a factor in the dissociation process, and the higher the temperature of a molecule, the more readily it will dissociate. In other words, a lower energy photon (higher wavelength) will cause molecular dissociation more readily at elevated temperatures, and this relationship is shown in FIG. 3. In the figure, in the area below the curve and bounded by the vertical dashed line, photons will dissociate molecules, and at higher wavelengths and thus reduced photon energy, molecules will not be dissociated. In regard to the dissociation of carbon dioxide in the presence of coal, the carbon dioxide will start dissociating into carbon monoxide in the presence of radiation and at a temperature range of approximately 100°-200° F. It should be noted that the graph of FIG. 3 is not scaled for temperature or wavelength frequency since the curve will vary depending upon the molecule being dissociated.

With respect to the dissociation of carbon monoxide into carbon and nascent oxygen in the presence of photon energy, it is noted that one photon of electromagnetic radiation of sufficiently high energy content is required for each carbon monoxide molecule dissociated. Since the molecular dissociation energy requirement is temperature dependent, it can be generally stated that at or near ambient temperatures of 60°-90° F., the wavelength of the electromagnetic radiation has to be less than 4000-4500 Å. At higher temperatures, for example, 1000°-1500° F., longer wavelength radiation (6000-8000 Å) will also have sufficiently high energy content to cause dissociation. The relevance of the above discussion and the graph shown in FIG. 3 is that molecular dissociation will occur in the reactor of the present invention from 100° C. and above. It should be noted that pressure is also a relevant factor in molecular dissociation, e.g., $CO_2$ dissociation will proceed more readily at lower pressures. The pressures range for CO conversion is preferably higher, as previously noted.

As above noted, the concepts of the present invention are particularly adaptable to both organic and inorganic sulfur, and it is the sulfur levels in coal that have caused environmental concern leading to very strict emission standards. The principal form of inorganic sulfur in coal comprises pyrite but marcasite and sulfate salts also occur. Organic sulfur compounds in the coal may comprise 20-85% of the total sulfur content of the coal. In accordance with the present invention, photolytic oxydesulfurization and photolytic hydrodesulfurization reduce both the organic and inorganic sulfur content in the coal to an environmentally acceptable level. It should be noted in this regard that coal desulfurization as presently commercially practiced removes basically only inorganic sulfur, by heavy media separators, jigs, concentrating tables, flotation processes, and the like. These systems are frequently incapable of meeting the low sulfur requirements of Federal and state regulations. Moreover, hydrodesulfurization processes of coal have not been extensively practiced to date and the technology is therefore limited.

The coal can be effectively desulfurized by irradiating it with solar radiation in the absence of molecular oxygen and in the presence of $CO_2$, which process preferentially gasifies sulfur in coal to produce sulfur oxides according to the reaction shown below:

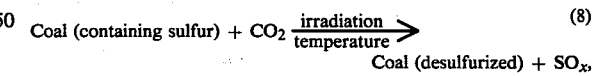
$$\text{Coal (containing sulfur)} + CO_2 \xrightarrow[\text{temperature}]{\text{irradiation}} \text{Coal (desulfurized)} + SO_x, \quad (8)$$

where $SO_x$ is sulfur oxides.

The above reaction is a combination of the following reactions:

$$CO_2 \xrightarrow{\text{irradiation}} CO + O\cdot, \text{ and} \quad (9)$$

$$S + 2O\cdot \rightarrow SO_2, \quad (10)$$

where S is sulfur in coal.

Of course, if irradiation continues after the preferential removal of sulfur from coal, carbon gasification according to reactions previously described will take place.

It is recognized that some sulfur in coal may be converted into sulfates ($SO_4$) in which form it no longer presents an air pollution threat.

A very important desulfurizing mechanism in addition to the preferential oxidation process set forth in reactions (9) and (10) is both implicit and explicit from the general reaction (4) described above. That equation applied to hydrodesulfurization, can be restated by the following sequential reactions:

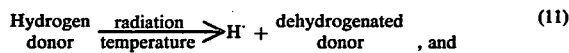

$$\text{Hydrogen donor} \xrightarrow[\text{temperature}]{\text{radiation}} H^\cdot + \text{dehydrogenated donor}, \text{ and} \quad (11)$$

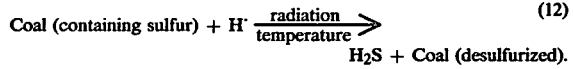

$$\text{Coal (containing sulfur)} + H^\cdot \xrightarrow[\text{temperature}]{\text{radiation}} H_2S + \text{Coal (desulfurized)}. \quad (12)$$

This process of preferential hydrogenation is analogous to the preferential oxygenation process for desulfurizing coal. With respect to the source of the hydrogen donor, this may comprise water or hydrocarbons already present in the coal or carbonaceous material, or the hydrogen donor source may be introduced into the reactor system from an external source. However, as previously described and emphasized, an air free environment is necessary in order to prevent nitrogen contamination of the gaseous reaction products. Hydrodesulfurization may take place in the presence of other gases or in their absence depending upon the results desired, for example, hydrodesulfurization can accompany decaking, demoisturizing and oxydesulfurization processes. Demoisturizing and devolatizing are potentially important concepts capable of achievement in accordance with the present invention, and these processes can be used for the treatment of tar sands and comparable carbon-containing materials which form important reserves of hydrocarbons. The devolatization of coal would permit recovery of volatiles in the coal, which range from 3–35%, and these volatiles can be upgraded to gasoline and other hydrocarbons, thereby providing an obviously useful energy source based on the utilization of solar energy under proper environmental operating conditions.

As mentioned above, $NO_2$ dissociates more readily upon irradiation than $CO_2$, and therefore coal gasification, desulfurization and decaking can be more readily accomplished. The dissociation reactions, which provide carbon monoxide as the reaction product which can be used as the energy source, are as follows:

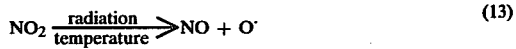

$$NO_2 \xrightarrow[\text{temperature}]{\text{radiation}} NO + O^\cdot \quad (13)$$

$$C + O \rightarrow CO \quad (14)$$

The overall expression for the above reactions is:

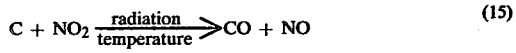

$$C + NO_2 \xrightarrow[\text{temperature}]{\text{radiation}} CO + NO \quad (15)$$

Although the generation of carbon monoxide is the desired result of the reactions, NO presents difficulties in handling and may subsequently be regenerated into $NO_2$ by combining with pure or atmospheric oxygen in the presence of irradiation and at the proper temperatures, and in the presence of a catalyst. At such conditions, the molecular oxygen breaks down into two atoms of nascent oxygen, which subsequently combines with NO to form $NO_2$. In this manner, $NO_2$ provides a useful coal gasification reactant.

The present invention can also be utilized for demoisturizing or drying agricultural crops, products and by-products. The drying process is similarly by solar radiation, preferably unconcentrated in an air free environment, that is, an environment free of molecular oxygen, and, if desired, in the presence of other gases to minimize or prevent oxidation. Examples of other gases providing the necessary environment are carbon dioxide, nitrogen and flue gas. The preferred temperature range for drying is 50°–300° C., although with respect to the use of flue gas, the upper temperature should preferably be reduced to approximately 200° C. to avoid combustion problems.

Agricultural crops may include wheat, corn, soy beans, rice, barley, rye, hay, grains, cereals, and other plant and vegetable products and materials. The proper temperature and gas environment will vary somewhat from product to product, and the proper atmosphere and temperature range can be selected to provide the drying without oxidation and without charring or otherwise damaging the crop being treated. It will be understood that means can be provided associated with the solar reactor for controlling the temperatures therein such as, for example, by controlling the rate of solar radiation admission or its degree of concentration, and/or crop residence times.

The present invention, as above noted, can also be utilized for decaking coal, that is, depolymerizing the coal. Decaked coals are desirable and frequently necessary in coal gasification and conversion processes. Solar radiation functions to decake the coal by photolytic cracking, and this process has advantages over present decaking processes which essentially involve high temperature drying. The absence of air or molecular oxygen is essential, and a pressure range of 0.5–10 atmospheres is preferred. $CO_2$ may be introduced as the reactant, although nitrogen and/or flue gases can also be employed instead of $CO_2$. It is preferred that the solar radiation be concentrated as previously described. Although decaking can be effected at relatively low temperatures (100° C.) in the presence of solar radiation, high temperatures and concentrated radiation increase the rate of the decaking process.

It will be thus be seen that in accordance with the invention carbon oxides can be irradiated, preferably by solar energy, in the presence of carbonaceous material and in an oxygen free environment to produce energy. The energy can be stored and, more importantly, converted to other more convenient sources of energy. When carbon dioxide is the reactant gas, the coal conversion process produces carbon monoxide, which can be removed from the system or further irradiated for conversion into a pure carbon product with the consequent release of thermal energy, which can be used for power generation. The solar radiation energy source permits the conversion reactions to take place at relatively low temperatures or at elevated temperatures, where the solar radiation is concentrated. The invention also has important implications in the desulfurization of coal and in the drying of agricultural products, and the coal conversion process can also be achieved with $NO_2$ as the reactant gas, with carbon monoxide again being the produced energy source. Also in accordance with the invention, carbon monoxide can be irradiated in the solar reactor to produce elemental, free carbon, a useful by-product.

I claim:

1. A photolytic process for the gasification of coal comprising the step of directly solar irradiating coal and carbon dioxide in an air free environment, and at elevated temperatures to produce carbon monoxide.

2. A photolytic process for gasification of coal comprising the step of directly solar irradiating coal and a hydrogen donor in an air free environment and at elevated temperatures.

3. The process of claim 2 wherein said hydrogen donor is water and the products obtained by the process include carbon monoxide and hydrogen.

4. The process of claim 2 wherein said hydrogen donor is hydrogen and the products obtained by the process include hydrocarbons.

5. A photolytic process for the gasification of carbonaceous material comprising the step of directly solar irradiating in concentrated form said carbonaceous material and carbon dioxide in an air free environment, and at elevated temperatures to produce carbon monoxide.

6. A photolytic process for gasification of carbonaceous material comprising the step of directly solar radiating said carbonaceous material and a hydrogen donor in an air free environment and at elevated temperatures.

7. The process of claim 6 wherein said hydrogen donor is water and the products obtained by the process include carbon monoxide and hydrogen.

8. The process of claim 7 wherein said hydrogen donor is hydrogen and the products obtained by the process include hydrocarbons.

9. The process of claim 5 wherein said carbonaceous material is selected from the group consisting of lignite, peat, coke, char, charcoal, vegetable or plant matter, animal manure, sewage sludge, tar asphault and pitch.

10. The process of claim 6 wherein said carbonaceous material is selected from the group consisting of lignite, peat, coke, char, charcoal, vegetable or plant matter, animal manure, sewage sludge, tar asphault and pitch.

11. A process for converting carbon monoxide to carbon with the production of useful heat energy which comprises subjecting said carbon monoxide to radiation, in the absence of air and a catalyst, and at elevated temperatures and pressures, to cause the dissociation of said carbon monoxide and formation of elemental carbon and carbon dioxide with a net production of heat energy, wherein the source of said radiation is electric arcs or electric arc lamps, and wherein said elevated pressures are in excess of 10 atmospheres.

* * * * *